Patented Apr. 29, 1924.

1,492,184

UNITED STATES PATENT OFFICE.

JAMES W. WEIR, OF FILLMORE, CALIFORNIA, AND JOHN C. BLACK, OF DESTREHAN, LOUISIANA.

METHOD OF TREATING COLLOIDAL CLAY.

No Drawing.    Application filed September 8, 1922. Serial No. 587,006.

*To all whom it may concern:*

Be it known that we, JAMES W. WEIR, a citizen of the United States, residing at Fillmore, in the county of Ventura and State of California, and JOHN C. BLACK, a citizen of the United States, residing at Destrehan, St. Charles Parish, Louisiana, have invented certain new and useful Improvements in Methods of Treating Colloidal Clay, of which the following is a specification.

This invention relates to the process of treating clays and has for its object both to improve and increase the decolorizing and treating properties of clay or kindred substances when admixed to petroleum oils, vegetable or animal oils, waxes, fats or sugar solutions.

In this invention when we speak of clay it is used in a broad sense and includes those substances known as montmorillonite, bauxite, willonite pyrophyllite, kaolinite, fuller's earth, diatomaceous earths and kindred substances.

It has heretofore been proposed to treat clay, montmorillonite, diatomaceous earth, etc., with sulphuric acid wherein from 25% to 50% by weight of acid was used to that of the clay and that process involved washing out the salts of reaction, drying and pulverizing the same. This old process will produce a finished product of good decolorizing properties, incidental to the process. However, there is considerable loss of clay or whatever material is used, due to the substance entering into chemical reaction with the acid and the products of reaction being later washed out or dissolved out in the water washing operation and removed.

There was also a very large consumption of acid in that process, and considerable time required for the washing operation all of which may to a very considerable extent be eliminated by our new process.

We have discovered that a clay to be most effective should have certain salts combined or intermixed with the clay and to this end we add sulphuric or hydrochloric acid in amounts up to but not exceeding 10 per cent by weight of the clay, montmorillonite or other substance treated. The acid acts chemically on some constituents of the clay and produces the salts we find to be beneficial in the decolorization, neutralizing and treatment of petroleum oils, vegetable and animal oils, waxes, sugars or other substances.

We do not know the reason why these salts, produced as they are within the clay particles, should bring about the beneficial results we obtain. It may be, however, an action similar to the action of similar salts on water containing suspended matter or colloids whereby they are coagulated and precipitated, thus clearing the water of the impurities.

The action of the clay is not wholly dependent upon the salts of the acid reaction, but the decolorizing, neutralizing and treating action of the clay is thereby largely increased. Furthermore the clay by the acid reaction is probably altered slightly in its physical structure and possibly in its chemical structure as well, whereby its decolorizing, neutralizing and treating effect is greatly improved over the untreated clay.

The advantages of our new and improved process lies in the fact that we add only sufficient acid to furnish the salts of the acid reaction that we find beneficial, and which we do not remove by the washing operation heretofore used where a large amount of acid is used. We also eliminate to a very great extent the amount of acid used; the washing operation to remove the salts of the acid reaction; and the loss of part of the clay itself by the action of the acid on the clay.

Our finished product has a greater weight after treatment than the original clay possessed, whereas by the old process of using a large amount of acid in the treatment and washing out the excess results of the acid reactions, the loss of weight in the finished product varied in amount from 10% to as much as 30% of its original weight.

The process we prefer to employ is as follows: the clay or other substance is pulverized and if not sufficiently dry to pulverize readily is previously dried, or partially so. The acid is then added, preferably diluted, so that the water of crystallization may be furnished from the diluting water. The adding of the water also permits of more ready admixture of the acid with the clay. The mixture is then allowed to dry with or without artificial heat; if artificial heat is applied it should never be sufficient to vaporize the water of crystallization contained within the clay. The dried product is then finely pulverized and is ready for use.

As an alternative process to the process just described, we may eliminate the drawing operation to a great extent, then pulverize the product and add it to the oil or other substance to be treated, heat being applied to the mixture to drive off the water in the clay and bring about the decolorizing, neutralizing and treating effect.

As a secondary alternative method we may make a mixture of water and raw clay, thus making a plastic mass, then add the acid either dilute or concentrated, then permit the clay and acid to react after which it may be dried with or without artificial heat, care being taken, if artificial heat is used, not to overheat the drying product to vaporize the water of crystallization; the product is then finely pulverized and is ready for use.

As a third alternative process we may use the mixture of clay and acid, after the reaction is complete or substantially so, without any attempt at drying and pulverizing whereby the more or less plastic mixture is added to the oil to be treated and heat applied to the oil and clay mixture to drive off the water and bring about the decolorizing, neutralizing and treating action of the clay.

It is to be understood that the treatment of the oil with the clay should be at an elevated temperature to insure the liberation of the free water contained in the clay and to this end it should be heated to a point in excess of the boiling point of water and maintained at such temperature until the reaction is complete.

What we claim and desire to secure by Letters Patent is:

1. A process of producing a clarifying, neutralizing refining and treating product for treating petroleum, vegetable and animal oils, waxes, sugars, and similar substances, which consists in treating clay with an amount of acid not exceeding 10% by weight of the clay without washing out the products of reaction.

2. A process of producing a clarifying, neutralizing and treating product for treating petroleum, vegetable and animal oils, waxes, sugars and similar substances which consists in intimately mixing sulfuric acid with clay and retaining the acid reaction products in the mixture, the per cent by weight of acid to the clay not exceeding 10 per cent.

3. A process of producing a clarifying, neutralizing and treating product for treating petroleum, vegetable and animal oils, waxes, sugars, and similar substances, which consists in treating clay with an amount of acid not exceeding 10% by weight of the clay retaining therein the products of reaction, then drying the resulting products.

4. A process of producing a clarifying, neutralizing and treating product for treating petroleum, vegetable and animal oils, waxes, sugars, and similar substances consisting in adding to clay an acid and retaining therein the salts of reaction formed by the admixture of acid to the clay adding only sufficient acid to react upon the constituents of the clay to produce a desired mixture of clay and salts of reaction with a resulting clarifying neutralizing and treating product of increased efficiency.

In testimony whereof we hereunto affix our signatures.

JAMES W. WEIR.
JOHN C. BLACK.